US011080997B2

(12) United States Patent
Yamada et al.

(10) Patent No.: US 11,080,997 B2
(45) Date of Patent: Aug. 3, 2021

(54) RECOMMENDED TRAVELING SPEED PROVISION PROGRAM, TRAVEL SUPPORT SYSTEM, VEHICLE CONTROL DEVICE, AND AUTOMATIC TRAVELING VEHICLE

(71) Applicants: SUMITOMO ELECTRIC INDUSTRIES, LTD., Osaka (JP); HONDA MOTOR CO., LTD., Tokyo (JP)

(72) Inventors: Hiroyuki Yamada, Osaka (JP); Shoichi Tanada, Osaka (JP); Shigeki Nishimura, Osaka (JP); Masataka Tokunaga, Osaka (JP); Hitoshi Konishi, Wako (JP)

(73) Assignees: SUMITOMO ELECTRIC INDUSTRIES, LTD., Osaka (JP); HONDA MOTOR CO., LTD., Tokyo (JP)

( * ) Notice: Subject to any disclaimer, the term of this patent is extended or adjusted under 35 U.S.C. 154(b) by 254 days.

(21) Appl. No.: 16/096,379

(22) PCT Filed: Mar. 30, 2017

(86) PCT No.: PCT/JP2017/013395
§ 371 (c)(1),
(2) Date: Oct. 25, 2018

(87) PCT Pub. No.: WO2017/187884
PCT Pub. Date: Nov. 2, 2017

(65) Prior Publication Data
US 2019/0122545 A1    Apr. 25, 2019

(30) Foreign Application Priority Data

Apr. 28, 2016 (JP) .............................. JP2016-090258

(51) Int. Cl.
*G08G 1/01* (2006.01)
*G08G 1/052* (2006.01)
(Continued)

(52) U.S. Cl.
CPC .............. *G08G 1/0145* (2013.01); *B60T 7/12* (2013.01); *B60T 7/18* (2013.01); *B60T 7/22* (2013.01);
(Continued)

(58) Field of Classification Search
CPC ...... G08G 1/0145; G08G 1/01; G08G 1/0112; G08G 1/052; G08G 1/09; G08G 1/096725;
(Continued)

(56) References Cited

U.S. PATENT DOCUMENTS 8,160,805 B2 *  4/2012  Downs ................ G08G 1/0133
                                                        701/117
9,361,797 B1 *  6/2016  Chen .................... G08G 1/0112
(Continued)

FOREIGN PATENT DOCUMENTS

CN    103047408 B   * 12/2015
CN    105185141 A   * 12/2015
(Continued)

OTHER PUBLICATIONS

Wenjia et al., "Probe Car based Traffic Information System Experiment in Shenyang," 2008, Publisher: IEEE.*
(Continued)

*Primary Examiner* — Tuan C To
(74) *Attorney, Agent, or Firm* — Faegre Drinker Biddle & Reath LLP

(57) ABSTRACT

A recommended traveling speed provision program according to one aspect of the present disclosure causes a computer to function as: an acquisition unit configured to acquire,
(Continued)

from probe vehicles, pieces of probe information each including information of a time within a predetermined time period and a position of the corresponding probe vehicle at the time; a representative traveling speed calculation unit configured to calculate a representative traveling speed that is a representative value of traveling speeds of the probe vehicles, based on the pieces of probe information acquired by the acquisition unit; a recommended traveling speed calculation unit configured to calculate a recommended traveling speed, based on the representative traveling speed calculated by the representative traveling speed calculation unit; and a provision unit configured to provide the recommended traveling speed calculated by the recommended traveling speed calculation unit to a target vehicle.

12 Claims, 12 Drawing Sheets

(51) Int. Cl.
| | | |
|---|---|---|
| G08G 1/0967 | (2006.01) | |
| G08G 1/16 | (2006.01) | |
| G05D 1/02 | (2020.01) | |
| B60T 7/12 | (2006.01) | |
| G08G 1/09 | (2006.01) | |
| B60T 8/17 | (2006.01) | |
| B60T 7/18 | (2006.01) | |
| B60T 7/22 | (2006.01) | |

(52) U.S. Cl.
CPC .............. *B60T 8/17* (2013.01); *G05D 1/0223* (2013.01); *G05D 1/0276* (2013.01); *G08G 1/01* (2013.01); *G08G 1/0112* (2013.01); *G08G 1/052* (2013.01); *G08G 1/09* (2013.01); *G08G 1/096725* (2013.01); *G08G 1/164* (2013.01); *G08G 1/166* (2013.01); *G08G 1/167* (2013.01); *B60T 2210/32* (2013.01); *B60T 2210/36* (2013.01); *G05D 2201/0213* (2013.01)

(58) Field of Classification Search
CPC ........ G08G 1/164; G08G 1/166; G08G 1/167; B60T 7/12; B60T 7/18; B60T 8/17; B60T 2210/32; B60T 2210/36; G05D 2201/0213
USPC .......................................................... 701/117
See application file for complete search history.

(56) References Cited

U.S. PATENT DOCUMENTS

| | | | | |
|---|---|---|---|---|
| 9,418,545 | B2 * | 8/2016 | Petrie | G08G 1/0133 |
| 2002/0059017 | A1 * | 5/2002 | Yamane | G08G 1/08 |
| | | | | 701/1 |
| 2007/0225894 | A1 * | 9/2007 | Tsukamoto | G08G 1/20 |
| | | | | 701/117 |
| 2009/0143966 | A1 * | 6/2009 | Jacobson | G08G 1/0104 |
| | | | | 701/118 |
| 2011/0282627 | A1 * | 11/2011 | Jang | G08G 1/0112 |
| | | | | 702/179 |
| 2011/0301802 | A1 | 12/2011 | Rupp et al. | |
| 2012/0158820 | A1 * | 6/2012 | Bai | G07C 5/008 |
| | | | | 709/202 |
| 2013/0018578 | A1 * | 1/2013 | Matsuo | G08G 1/168 |
| | | | | 701/431 |
| 2014/0207357 | A1 * | 7/2014 | Shimotani | B60K 31/00 |
| | | | | 701/93 |
| 2016/0104376 | A1 * | 4/2016 | Fowe | G08G 1/0129 |
| | | | | 701/119 |
| 2016/0265930 | A1 * | 9/2016 | Thakur | G05D 1/0088 |
| 2016/0335923 | A1 * | 11/2016 | Hofmann | G09B 29/003 |
| 2016/0364983 | A1 * | 12/2016 | Downs | G08G 1/0141 |
| 2016/0379488 | A1 * | 12/2016 | Fowe | G01C 21/30 |
| | | | | 701/119 |
| 2017/0069200 | A1 * | 3/2017 | Masutani | H04L 67/42 |
| 2017/0309171 | A1 * | 10/2017 | Zhao | G08G 1/0112 |
| 2017/0343371 | A1 * | 11/2017 | Anastassov | G08G 1/052 |
| 2018/0259976 | A1 * | 9/2018 | Williams | G01C 21/32 |

FOREIGN PATENT DOCUMENTS

| | | | | |
|---|---|---|---|---|
| EP | 3051515 A1 * | 8/2016 | ............ | G01C 21/26 |
| JP | H10-300493 A | 11/1998 | | |
| JP | 2003-272089 A | 9/2003 | | |
| JP | 2004-156982 A | 6/2004 | | |
| JP | 2009-137550 A | 6/2009 | | |
| JP | 2009-140292 A | 6/2009 | | |
| JP | 2010-170385 A | 8/2010 | | |
| JP | 2011-138431 A | 7/2011 | | |
| JP | 2011174770 A * | 9/2011 | .......... | G01C 21/005 |
| JP | 2012-083995 A | 4/2012 | | |
| JP | 2013-041316 A | 2/2013 | | |
| JP | 2013-257667 A | 12/2013 | | |
| JP | 2015-052902 A | 3/2015 | | |
| JP | 2015-161967 A | 9/2015 | | |
| JP | 2015-161968 A | 9/2015 | | |
| WO | WO-2015147149 A1 * | 10/2015 | .......... | A01B 69/008 |

OTHER PUBLICATIONS

Steven et al., "Evaluation of Probe Vehicle Sampling Strategies for Traffic Signal Control," 2011, Publisher: IEEE.*

Jan-Shin et al., "An Unbiased Average Traffic Speed Estimation Method for intelligent Transportation System," 2012, Publisher: IEEE.*

D.J. Dailey et al., "Virtual Speed Sensors using Transit Vehicles as Traffic Probes," 2002, Publisher: IEEE.*

Liang et al., "Arterial Speed Studies with Taxi Equipped with Global Positioning Receivers as Probe Vehicle," 2005, vol. 2; Publisher: IEEE.*

* cited by examiner

FIG. 4

| EXTERNAL EVENT | CORRECTION VALUE |
|---|---|
| PRECIPITATION NOT LESS THAN 10 mm/h | −10 km/h |
| FOG | RECOMMENDED TRAVELING SPEED 50 km/h |
| ⋮ | ⋮ | they
RECOMMENDED TRAVELING SPEED PROVISION PROGRAM, TRAVEL SUPPORT SYSTEM, VEHICLE CONTROL DEVICE, AND AUTOMATIC TRAVELING VEHICLE

TECHNICAL FIELD

The present disclosure relates to recommended traveling speed provision programs, traveling support systems, vehicle control devices, and automatic traveling vehicles.

This application claims priority on Japanese Patent Application No. 2016-90258 filed on Apr. 28, 2016, the entire contents of which are incorporated herein by reference.

BACKGROUND ART

A merging information provision device has been proposed, which analyzes an image taken by a camera installed at a merging point, forecasts a future situation based on the positions, sizes, speeds, etc., of vehicles shown in the image, and provides a merging vehicle with information of instruction such as urging of deceleration (refer to Patent Literature 1, for example).

Meanwhile, a traveling control device has been proposed, which performs roadside-to-vehicle communication, acquires, from a roadside apparatus, information such as the total distance, start position, etc., of a merging lane, and executes traveling control for a vehicle based on the information (refer to Patent Literature 2, for example).

Furthermore, a merging support device has been proposed, which performs vehicle-to-vehicle communication, and instructs an own vehicle traveling on a merging lane or another vehicle traveling on a main lane to perform speed control, based on speed information acquired from surrounding vehicles (refer to Patent Literature 3, for example).

CITATION LIST

Patent Literature

PATENT LITERATURE 1: Japanese Laid-Open Patent Publication No. 2015-52902
PATENT LITERATURE 2: Japanese Laid-Open Patent Publication No. 2009-137550
PATENT LITERATURE 3: Japanese Laid-Open Patent Publication No. 2012-83995
PATENT LITERATURE 4: Japanese Laid-Open Patent Publication No. H10-300493
PATENT LITERATURE 5: Japanese Laid-Open Patent Publication No. 2015-161967
PATENT LITERATURE 6: Japanese Laid-Open Patent Publication No. 2015-161968

SUMMARY OF INVENTION

A recommended traveling speed provision program according to one aspect of the present disclosure is a recommended traveling speed provision program for providing a recommended traveling speed to a target vehicle, and the program causes a computer to function as: an acquisition unit configured to acquire, from probe vehicles, pieces of probe information each including information of a time within a predetermined time period and a position of the corresponding probe vehicle at the time; a representative traveling speed calculation unit configured to calculate a representative traveling speed that is a representative value of traveling speeds of the probe vehicles, based on the pieces of probe information acquired by the acquisition unit; a recommended traveling speed calculation unit configured to calculate a recommended traveling speed, based on the representative traveling speed calculated by the representative traveling speed calculation unit; and a provision unit configured to provide the recommended traveling speed calculated by the recommended traveling speed calculation unit to the target vehicle.

A traveling support system according to another aspect of the present disclosure is a traveling support system for supporting traveling of a target vehicle, and the system includes: an acquisition unit configured to acquire, from probe vehicles, pieces of probe information each including information of a time within a predetermined time period and a position of the corresponding probe vehicle at the time; a representative traveling speed calculation unit configured to calculate a representative traveling speed that is a representative value of traveling speeds of the probe vehicles, based on the pieces of probe information acquired by the acquisition unit; a recommended traveling speed calculation unit configured to calculate a recommended traveling speed, based on the representative traveling speed calculated by the representative traveling speed calculation unit; and a provision unit configured to provide the recommended traveling speed calculated by the recommended traveling speed calculation unit to the target vehicle.

A vehicle control device according to still another aspect of the present disclosure is a vehicle control device for controlling traveling of an automatic traveling vehicle, and the device includes: an acquisition unit configured to acquire a recommended traveling speed calculated based on a representative traveling speed that is a representative value of traveling speeds of probe vehicles, the representative traveling speed being based on pieces of probe information each including information of a time within a predetermined time period and a position of the corresponding probe vehicle at the time; and a traveling control unit configured to control a traveling speed of the automatic traveling vehicle, based on the recommended traveling speed acquired by the acquisition unit.

An automatic traveling vehicle according to still another aspect of the present disclosure includes the above-described vehicle control device.

BRIEF DESCRIPTION OF DRAWINGS

FIG. 4 is a diagram showing an example of external event information accumulated in an external event accumulation unit.

DESCRIPTION OF EMBODIMENTS

Figure 1:
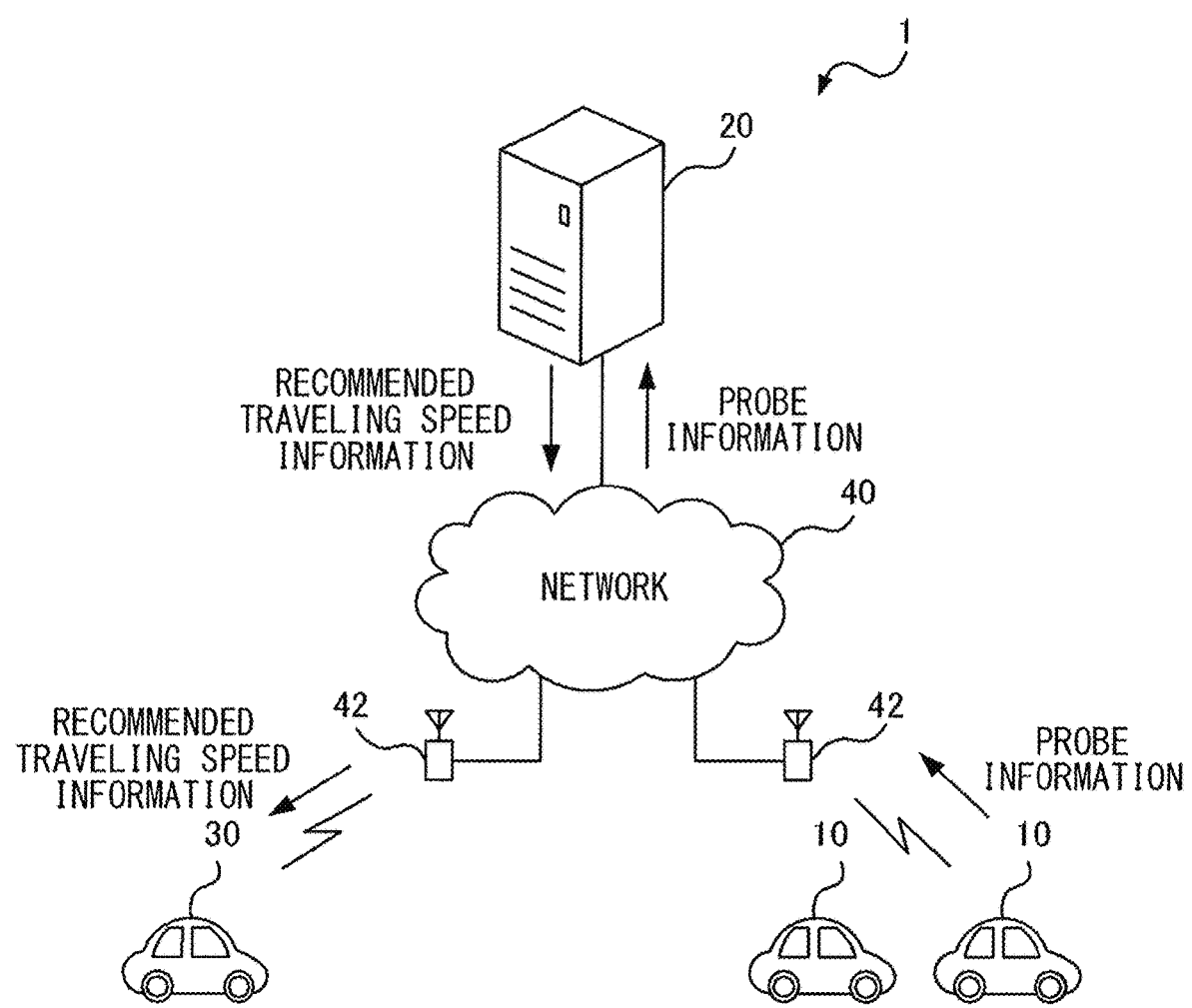
FIG. 1 is a diagram showing a configuration of a traveling support system according to a first embodiment.

Conventionally, various types of apparatuses for controlling the traveling speed of a vehicle so that the vehicle, traveling on a merging lane, can smoothly merge into a main lane, have been proposed.

Technical Problem

In the technologies disclosed in Patent Literatures 1 and 2, support for merging can be performed at a merging point where a camera or a roadside apparatus is installed, whereas support for merging cannot be performed at a merging point where either of them is not installed. Also on a main lane other than the merging point, support for a lane change or the like cannot be performed if a camera or a roadside apparatus is not installed.

In the technology disclosed in Patent Literature 3, speed information is acquired through vehicle-to-vehicle communication. Therefore, speed control can be instructed only immediately before merging at a merging point. Therefore, speed control cannot be performed in advance of merging, which may result in a situation that the timing of speed control is delayed.

The present disclosure has been made in view of the aforementioned problems, and it is an object of the present disclosure to provide a recommended traveling speed provision program and a traveling support system which are able to perform support of speed control for a target vehicle traveling on a lane, at an arbitrary point on the lane.

It is another object of the present disclosure to provide a vehicle control device and an automatic traveling vehicle which are able to receive support of speed control at an arbitrary point.

Advantageous Effects of Disclosure

According to this disclosure, support of speed control can be performed for a target vehicle traveling on a lane, at an arbitrary point on the lane.

DESCRIPTION OF EMBODIMENTS

First, contents of embodiments of the present disclosure will be listed and described.

A recommended traveling speed provision program according to the present disclosure is a recommended traveling speed provision program for providing a recommended traveling speed to a target vehicle, and the program causes a computer to function as: an acquisition unit configured to acquire, from probe vehicles, pieces of probe information each including information of a time within a predetermined time period and a position of the corresponding probe vehicle at the time; a representative traveling speed calculation unit configured to calculate a representative traveling speed that is a representative value of traveling speeds of the probe vehicles, based on the pieces of probe information acquired by the acquisition unit; a recommended traveling speed calculation unit configured to calculate a recommended traveling speed, based on the representative traveling speed calculated by the representative traveling speed calculation unit; and a provision unit configured to provide the recommended traveling speed calculated by the recommended traveling speed calculation unit to the target vehicle.

According to this configuration, a representative traveling speed of probe vehicles and a recommended traveling speed are calculated based on pieces of probe information acquired from the probe vehicles, and the recommended traveling speed is provided to the target vehicle. The place where probe information is acquired is not limited to a narrow area around a merging point or the like, and probe information can be acquired from a probe vehicle traveling on an arbitrary point. In addition, the place where a recommended traveling speed is provided is also not limited to a narrow area around a merging point or the like. Therefore, support of speed control can be performed for the target vehicle traveling on a lane, at an arbitrary point on the lane.

Preferably, the representative traveling speed calculation unit calculates the representative traveling speed, based on the probe information including information of positions within an area around a merging point at which a plurality of lanes merge, among the pieces of probe information acquired by the acquisition unit.

According to this configuration, a representative traveling speed is calculated based on pieces of probe information of probe vehicles traveling before and after the merging point, and a recommended traveling speed is calculated based on the representative traveling speed. Therefore, support of speed control can be performed in advance on a vehicle traveling toward the merging point.

Preferably, the representative traveling speed calculation unit calculates the representative traveling speed, for each of zones of a road on which the probe vehicles travel, based on the probe information including information of positions included in the zone. The recommended traveling speed calculation unit calculates the recommended traveling speed for each zone, based on the representative traveling speed calculated for each zone by the representative traveling speed calculation unit.

Since probe information includes positional information of the corresponding probe vehicle, a zone in which the probe vehicle travels can be identified based on the probe information. Therefore, according to this configuration, a recommended traveling speed in each of zones of the road can be calculated and provided to the target vehicle. Therefore, the target vehicle can perform speed control according to the recommended traveling speed for each zone. For example, when speed control for the target vehicle is performed by using a recommended traveling speed for a zone of a main lane located upstream of a merging point, the target vehicle can merge into the main lane without causing reduction in traveling speed of vehicles traveling on the main lane. On the other hand, when speed control for the target vehicle is performed by using a recommended traveling speed for a zone of the main lane located downstream of the merging point, the states of vehicles after merging can be reflected in the speed control. Thus, the target vehicle can perform speed control such as deceleration in advance, in case that the lane into which the target vehicle merges is congested with vehicles.

Preferably, the representative traveling speed calculation unit calculates the representative traveling speed for each of the zones, based on the pieces of probe information acquired by the acquisition unit, excluding pieces of probe information of the probe vehicles traveling on a merging lane that merges with a main lane.

According to this configuration, a recommended traveling speed is calculated based on the pieces of probe information acquired from probe vehicles advancing on the main lane.

Therefore, when the target vehicle merges from the merging lane into the main lane, the target vehicle can travel on the merging lane at a speed conforming to the traveling speeds of vehicles already traveling on the main lane. Thus, the target vehicle can smoothly merge from the merging lane into the main lane.

Preferably, the representative traveling speed calculation unit calculates the representative traveling speed for each of courses on which the probe vehicles travel, based on the probe information including information of positions included in the course. The recommended traveling speed calculation unit calculates the recommended traveling speed for each course, based on the representative traveling speed calculated for each course by the representative traveling speed calculation unit.

Since an automatic traveling vehicle travels based on map information having highly-accurate positional information, information of a lane can be included in probe information acquired from the automatic traveling vehicle. Therefore, a recommended traveling speed for each course can be calculated and provided to the target vehicle. Therefore, the target vehicle can perform speed control according to the recommended traveling speed for each course. For example, when the target vehicle merges into a first lane of a road with two lanes in each direction, the target vehicle performs speed control according to a recommended traveling speed for the first lane, thereby achieving the speed control without being affected by the traveling speeds of vehicles traveling on a second lane.

Preferably, the representative traveling speed calculation unit calculates the representative traveling speed by preferentially using the probe information acquired from a vehicle whose traveling lane can be identified, among the pieces of probe information acquired by the acquisition unit.

A vehicle whose traveling lane can be identified, which is represented by an automatic traveling vehicle, travels based on map information having highly-accurate positional information. Therefore, information of a lane can be included in probe information acquired from the vehicle whose traveling lane can be identified. The vehicle whose traveling lane can be identified is provided with various sensors such as a camera and a radar device for observing the surrounding situations, and is designed to perform safe driving at all times. Therefore, when a representative traveling speed is calculated by preferentially using probe information acquired from the vehicle whose traveling lane can be identified, a recommended traveling speed suitable for safe traveling can be calculated and provided to the target vehicle. Therefore, the target vehicle can perform speed control according to the safe recommended traveling speed.

Preferably, in a case where the acquisition unit could not acquire the pieces of probe information from the probe vehicles not less than a predetermined number-of-vehicle threshold within the predetermined time interval, the representative traveling speed calculation unit outputs, as a calculation result, a representative traveling speed that has been calculated based on probe information acquired by the acquisition unit before the predetermined time period.

According to this configuration, when probe information could not be acquired within the predetermined time period, a representative traveling speed calculated based on probe information acquired in the past is outputted as a calculation result. Then, a recommended traveling speed calculated based on the representative traveling speed is provided to the target vehicle. Therefore, even when probe information could not be acquired, the target vehicle can perform speed control according to an appropriate recommended traveling speed. For example, by using a recommended traveling speed based on probe information acquired in the same time zone on the same day of a week in the past, the target vehicle can perform speed control in a traffic condition similar to the current traffic condition, thereby supporting safe driving.

Preferably, in a case where the representative traveling speed calculated by the representative traveling speed calculation unit is lower than a predetermined lower limit speed value, the recommended traveling speed calculation unit calculates the lower limit speed value as the recommended traveling speed.

According to this configuration, when a representative traveling speed of probe vehicles becomes lower than the lower limit speed value due to traffic congestion or the like, the target vehicle can be prevented from being provided with a recommended traveling speed lower than the lower limit speed value. Thus, more traffic congestion is prevented from occurring. For example, when a representative traveling speed of probe vehicles is lower than the lower limit speed value because of traffic congestion on a main lane but a merging lane is not congested, the target vehicle traveling on the merging lane is prevented from receiving an excessively low recommended traveling speed. Thus, traffic congestion on the merging lane can be avoided.

A traveling support system according to another aspect of the present disclosure is a traveling support system for supporting traveling of a target vehicle, and the system includes: an acquisition unit configured to acquire, from probe vehicles, pieces of probe information each including information of a time within a predetermined time period and a position of the corresponding probe vehicle at the time; a representative traveling speed calculation unit configured to calculate a representative traveling speed that is a representative value of traveling speeds of the probe vehicles, based on the pieces of probe information acquired by the acquisition unit; a recommended traveling speed calculation unit configured to calculate a recommended traveling speed, based on the representative traveling speed calculated by the representative traveling speed calculation unit; and a provision unit configured to provide the recommended traveling speed calculated by the recommended traveling speed calculation unit to the target vehicle.

According to this configuration, a representative traveling speed of probe vehicles and a recommended traveling speed are calculated based on pieces of probe information acquired from the probe vehicles, and the recommended traveling speed is provided to the target vehicle. The place where probe information is acquired is not limited to a narrow area around a merging point or the like, and probe information can be acquired from a probe vehicle traveling on an arbitrary point. In addition, the place where a recommended traveling speed is provided is also not limited to a narrow area around a merging point or the like. Therefore, support of speed control can be performed for the target vehicle traveling on a lane, at an arbitrary point on the lane.

Preferably, the traveling support system further includes a target vehicle configured to acquire the recommended traveling speed provided from the provision unit, and to control a traveling speed thereof in accordance with the recommended traveling speed acquired.

According to this configuration, the target vehicle can perform speed control according to the recommended traveling speed.

A vehicle control device according to still another aspect of the present disclosure is a vehicle control device for controlling traveling of an automatic traveling vehicle, and the device includes: an acquisition unit configured to acquire a recommended traveling speed calculated based on a representative traveling speed that is a representative value of traveling speeds of probe vehicles, the representative traveling speed being based on pieces of probe information each including information of a time within a predetermined time period and a position of the corresponding probe vehicle at the time; and a traveling control unit configured to control a traveling speed of the automatic traveling vehicle, based on the recommended traveling speed acquired by the acquisition unit.

According to this configuration, the traveling speed of an automatic traveling vehicle can be controlled based on a recommended traveling speed calculated based on a representative traveling speed based on pieces of probe information of probe vehicles. The place where a recommended traveling speed is provided is not limited to a narrow area around a merging point or the like. Therefore, the automatic traveling vehicle can receive support of speed control at an arbitrary point.

An automatic traveling vehicle according to a further aspect of the present disclosure includes the above-described vehicle control device.

This configuration includes the configuration of the above-described vehicle control device. Therefore, for the same reasons as described above, the automatic traveling vehicle can receive support of speed control at an arbitrary point.

DETAILED DESCRIPTION OF EMBODIMENTS

Hereinafter, embodiments of the present disclosure will be described in detail with reference to the drawings. It is to be noted that each of the embodiments described below shows a preferable and specific example of the present disclosure. Numerical values, shapes, components, arrangement and connection configuration of the components, steps, processing order of the steps, etc., shown in the following embodiments are merely examples, and are not intended to limit the scope of the present disclosure. The present disclosure is specified in claims. Therefore, among the components in the following embodiments, components not recited in any one of independent claims defining the most generic concept of the present disclosure are not necessarily required to achieve the objects of the present disclosure, but are used to form preferable embodiments.

First Embodiment

1. Overall Configuration of System

FIG. 1 is a diagram showing a configuration of a traveling support system according to a first embodiment of the present disclosure.

With reference to FIG. 1, a traveling support system 1 is a system for supporting traveling of a target vehicle that travels on a road. The traveling support system 1 includes a server 20 and a target vehicle 30.

The server 20 receives probe information from probe vehicles 10 traveling on a road. Based on the received probe information, the server 20 provides the target vehicle 30 with a recommended traveling speed for the target vehicle 30 during traveling, e.g., a recommended traveling speed that allows the target vehicle 30 advancing toward a merging point of a freeway to safely merge into a cruising lane.

The target vehicle 30 is an automatic traveling vehicle (self-driving car) or an ordinary vehicle driven by a driver. The target vehicle 30 receives information of the recommended traveling speed provided from the server 20, and executes a safety driving assistant process for the target vehicle 30, based on the received recommended traveling speed information. That is, the target vehicle 30 displays the recommended traveling speed information on a display screen of a navigation device. When the target vehicle 30 is an automatic traveling vehicle, the target vehicle 30 determines a traveling speed based on the recommended traveling speed information, and performs control of acceleration or braking so as to travel at the determined speed.

Each probe vehicle 10 generates, at predetermined time intervals (e.g., 3-second intervals), probe information including at least information of the position where the probe vehicle 10 travels and information of the time at which the probe vehicle 10 travels at the position. The probe vehicle 10 transmits the generated probe information to the server 20 via a wireless base station 42 and a network 40. Transmission of the probe information to the server 20 may be performed in real time, or may be performed at predetermined time intervals or at a time when a predetermined number of pieces of probe information have been collected. The network 40 may be a public communication network such as the Internet or a mobile phone network, or may be a private communication network.

2. Configuration of Probe Vehicle 10

Figure 2:
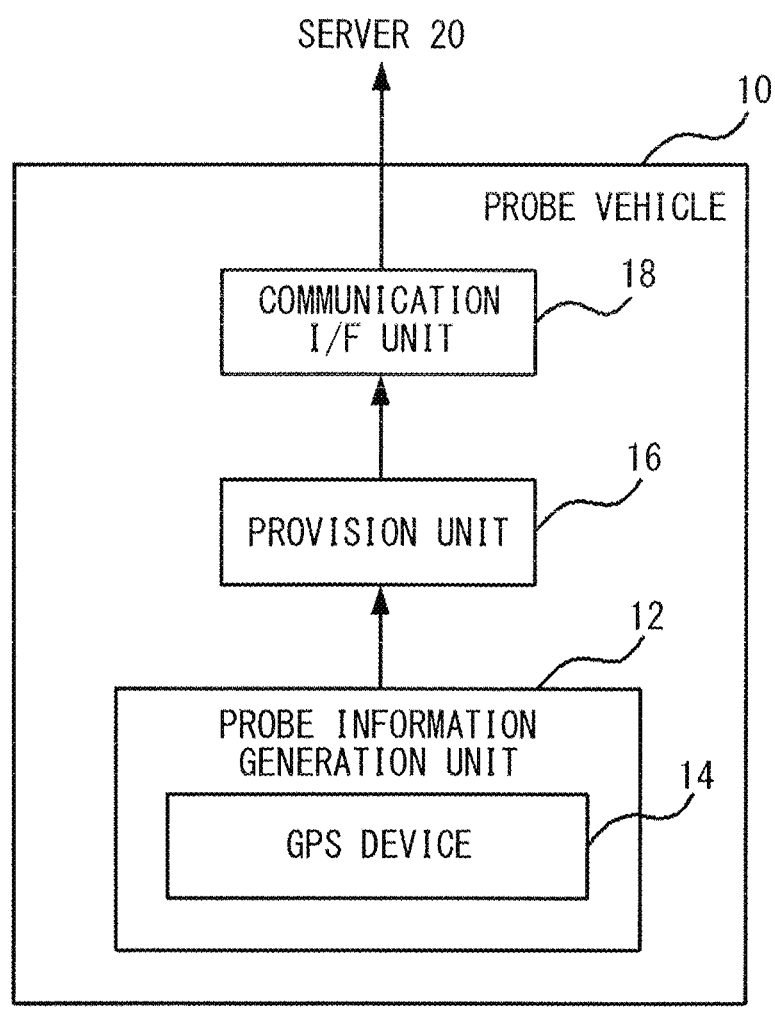
FIG. 2 is a block diagram showing a functional configuration of a probe vehicle.

FIG. 2 is a block diagram showing a functional configuration of the probe vehicle 10. FIG. 2 shows only processing units relating to generation of probe information, while illustration of processing units relating to traveling of the probe vehicle 10 is omitted.

With reference to FIG. 2, the probe vehicle 10 includes a probe information generation unit 12, a provision unit 16, and a communication I/F (interface) unit 18. The probe information generation unit 12 and the provision unit 16 are implemented by a processor that performs digital signal processing, such as a CPU (Central Processing Unit) or an MPU (Micro-Processing Unit). These units 12 and 16 may be implemented by a single processor, or may be implemented by separate processors.

The probe information generation unit 12 is configured to include a GPS (Global Positioning System) device 14. The probe information generation unit 12 generates, at predetermined time intervals, probe information including at least information of the position of the probe vehicle 10 measured by the GPS device 14 and information of the time at which the probe vehicle 10 travels at the position. The positional information of the probe vehicle 10 includes latitude information and longitude information.

The provision unit 16 transmits the probe information generated by the probe information generation unit 12 to the server 20 through the communication I/F unit 18, thereby providing the probe information to the server 20. As described above, the probe information may be transmitted one by one in real time, or a plurality of pieces of probe information may be transmitted in a batch.

The communication I/F unit 18 is a communication interface for wirelessly transmitting data, and is implemented by a wireless module or the like.

The probe information generation unit 12 may receive speed information from a speedometer or the like, and include the received speed information in the probe information.

The probe information generation unit 12, the provision unit 16, and the communication I/F unit 18 may be implemented by a dedicated probe terminal, or may be implemented by a general terminal such as a smart phone used by the driver of the probe vehicle 10.

3. Configuration of Server 20

Figure 3:
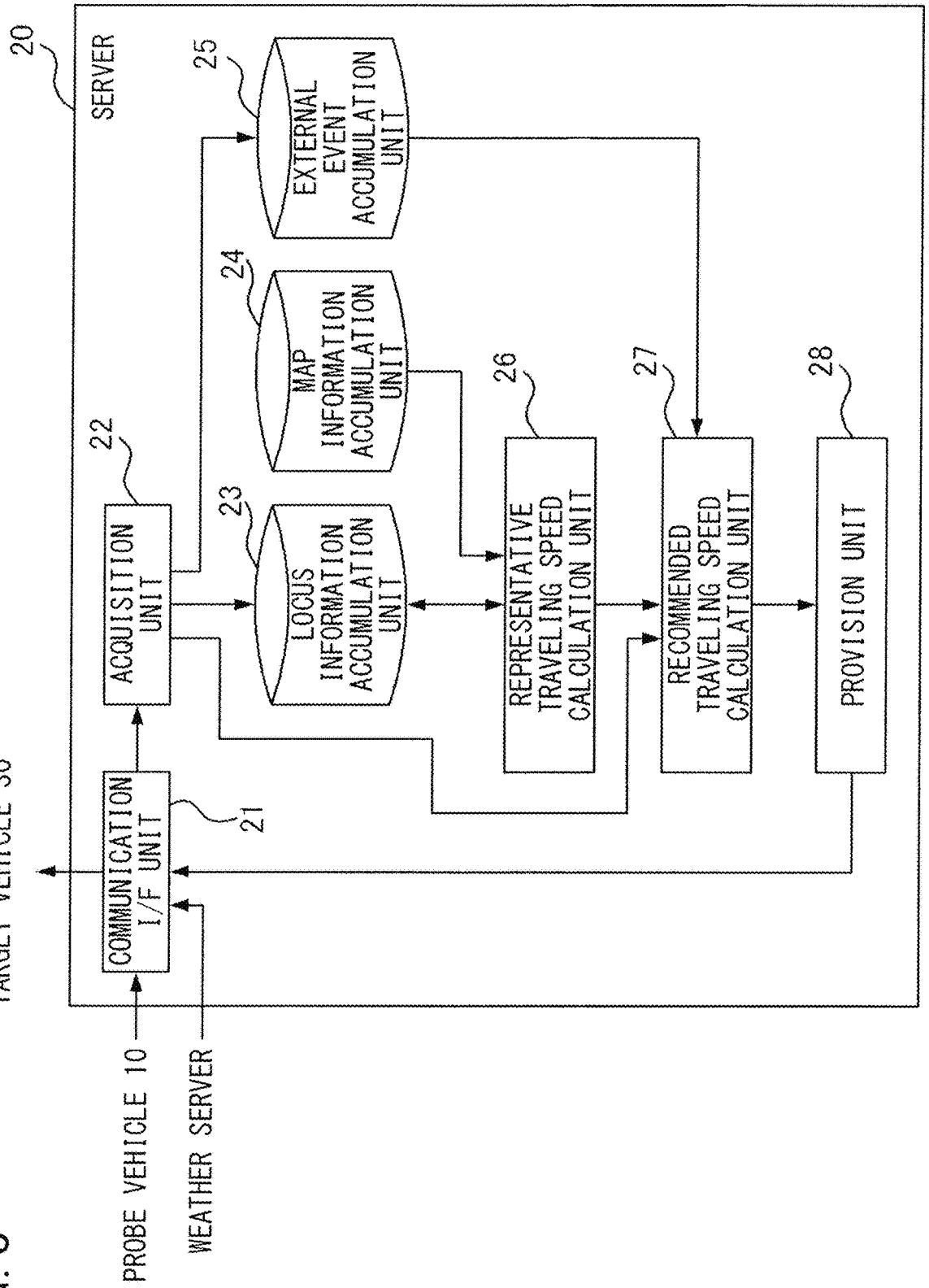
FIG. 3 is a block diagram showing a functional configuration of a server.

FIG. 3 is a block diagram showing a functional configuration of the server 20. The server 20 is a computer including: a processor that performs digital signal processing, such as a CPU or an MPU; an RAM (Random Access Memory); an ROM (Read Only Memory), and the like.

With reference to FIG. 3, the server 20 includes a communication I/F unit 21, an acquisition unit 22, a locus information accumulation unit 23, a map information accumulation unit 24, an external event accumulation unit 25, a representative traveling speed calculation unit 26, a recommended traveling speed calculation unit 27, and a provision unit 28. The acquisition unit 22, the representative traveling speed calculation unit 26, the recommended traveling speed calculation unit 27, and the provision unit 28 are implemented by a processor such as a CPU. These units 22, 26, 27, and 28 may be implemented by a single processor, or may be implemented by separate processors.

The communication I/F unit 21 is a communication interface for wirelessly transmitting/receiving data to/from each probe vehicle 10, the target vehicle 30, and a weather server. The communication I/F unit 21 is implemented by a wireless module or the like.

The acquisition unit 22 acquires probe information from each probe vehicle 10 via the communication I/F unit 21. In addition, the acquisition unit 22 acquires current weather information from the weather server.

The locus information accumulation unit 23 is a storage device in which the probe information acquired by the acquisition unit 22 is accumulated, and is implemented by an HDD (Hard Disc Drive) or the like.

The map information accumulation unit 24 is a storage device in which map information of roads on which vehicles travel is accumulated, and is implemented by an HDD or the like.

The external event accumulation unit 25 is a storage device in which external event information used for correcting a recommended traveling speed is accumulated. The external event accumulation unit 25 is implemented by an HDD or the like. The external event information is information indicating a combination of an event relating to weather and a correction value for a recommended traveling speed corresponding to the event. FIG. 4 shows an example of external event information accumulated in the external event accumulation unit 25. For example, a correction value for a recommended traveling speed in the case where the precipitation is not less than 10 mm/h is −10 km/h. When fog rises, a correction value instructing that the recommended traveling speed should be 50 km/h, is shown.

The representative traveling speed calculation unit 26 calculates a representative traveling speed that is a representative value of traveling speeds of a plurality of probe vehicles 10, based on the probe information accumulated in the locus information accumulation unit 23 and the map information accumulated in the map information accumulation unit 24. For example, an average value of traveling speeds of a plurality of probe vehicles 10 may be used as a representative traveling speed. Alternatively, a median value or a most frequent value of traveling speeds of a plurality of probe vehicles 10 may be used as a representative traveling speed. When traveling speed information of a probe vehicle 10 is included in probe information, the traveling speed of the probe vehicle 10 can be acquired from the traveling speed information. However, when traveling speed information of a probe vehicle 10 is not included in probe information, a traveling speed of the probe vehicle 10 may be obtained by calculating a movement distance per unit time from a movement distance and a movement time within a traveling speed calculation target section, based on probe information acquired when the probe vehicle 10 travels near both end points of the traveling speed calculation target section.

The recommended traveling speed calculation unit 27 calculates a recommended traveling speed, based on the representative traveling speed calculated by the representative traveling speed calculation unit 26. Usually, a representative traveling speed is calculated as a recommended traveling speed. However, according to need, a value obtained by correcting a representative traveling speed may be calculated as a recommended traveling speed. For example, when a representative traveling speed is lower than a lower limit speed value, the lower limit speed value is used as a recommended traveling speed to prevent the recommended traveling speed from being lower than the lower limit speed value. Further, by referring to the external event information accumulated in the external event accumulation unit 25, the recommended traveling speed calculation unit 27 obtains a correction value for a recommended traveling speed, based on current weather information acquired from the weather server by the acquisition unit 22, and corrects the recommended traveling speed, based on the correction value.

The provision unit 28 transmits information of the recommended traveling speed calculated by the recommended traveling speed calculation unit 27 to the target vehicle 30 via the communication I/F unit 21. Thus, the recommended traveling speed information is provided to the target vehicle 30 or the driver of the target vehicle 30.

4. Configuration of Target Vehicle 30

Figure 5:
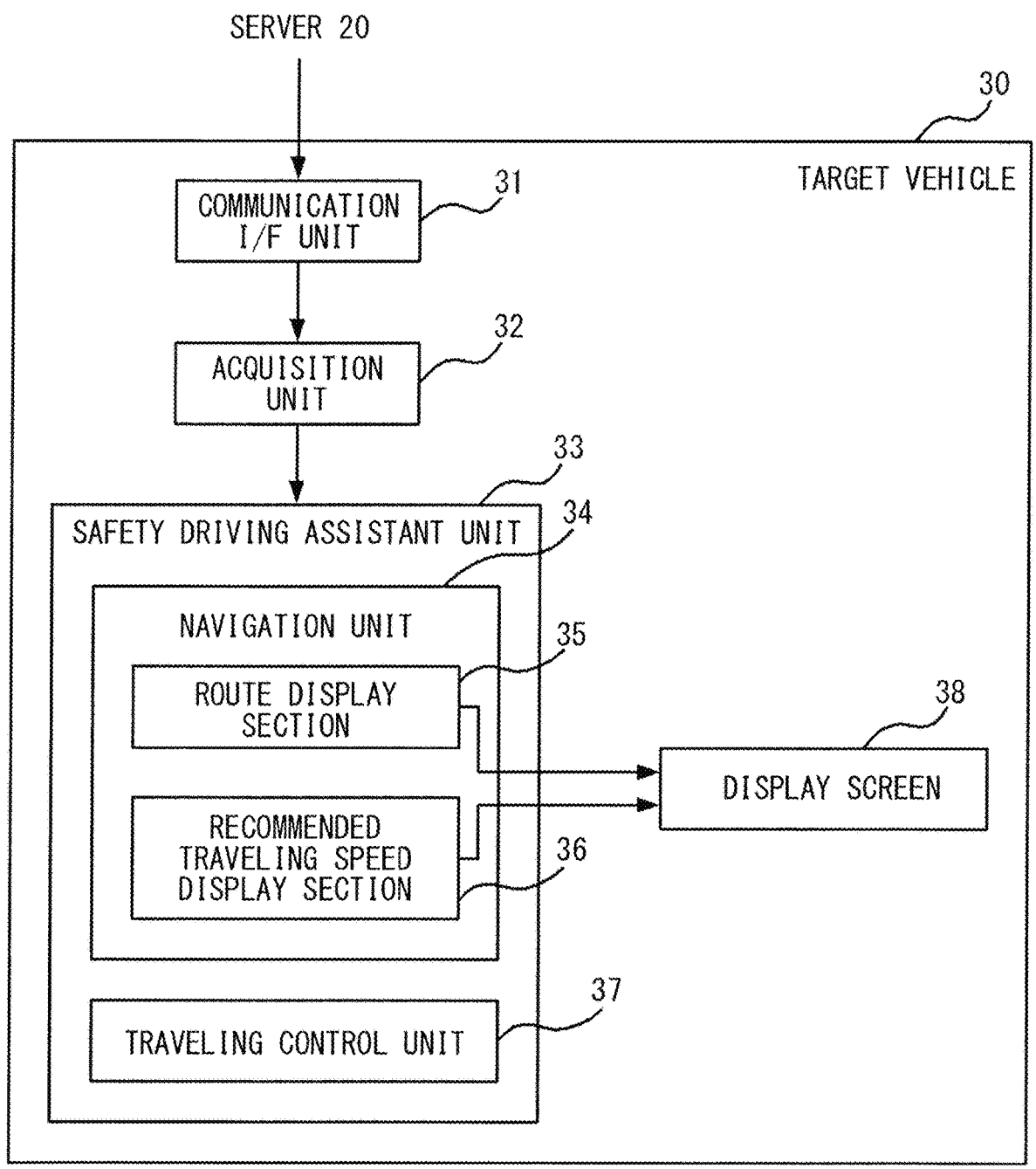
FIG. 5 is a block diagram showing a functional configuration of a target vehicle.

FIG. 5 is a block diagram showing a functional configuration of the target vehicle 30.

With reference to FIG. 5, the target vehicle 30 includes a communication I/F unit 31, an acquisition unit 32, a safety driving assistant unit 33, and a display screen 38. These processing units function as a vehicle control device for controlling the target vehicle 30. The acquisition unit 32 and the safety driving assistant unit 33 are implemented by, for example, a processor that performs digital signal processing, such as a CPU or an MPU. These units 32 and 33 may be implemented by a single processor, or may be implemented by separate processors.

The communication I/F unit 31 is a communication interface for wirelessly receiving data from the server 20, and is implemented by a wireless module or the like.

The acquisition unit 32 acquires the recommended traveling speed information from the server 20 via the communication I/F unit 31.

The safety driving assistant unit 33 is a processing unit that performs a safety driving assistant process for the target vehicle 30, based on the recommended traveling speed information acquired by the acquisition unit 32. The safety driving assistant unit 33 includes a navigation unit 34 and a traveling control unit 37. The navigation unit 34 and the traveling control unit 37 are also implemented by a processor such as a CPU or an MPU, for example. These units 34 and 37 may be implemented by a single processor, or may be implemented by separate processors.

The display screen 38 is a display unit such as a display used for the safety driving assistant process by the safety driving assistant unit 33.

The navigation unit 34 is a processing unit that performs route guidance to a destination, for the driver of the target vehicle 30. The navigation unit 34 includes a route display section 35 and a recommended traveling speed display section 36. The route display section 35 calculates a route to a destination, and performs control to display the route on the display screen 38. The recommended traveling speed display section 36 performs control to display a recommended traveling speed on the display screen 38. The navigation unit 34 may notify the driver of the recommended traveling speed by voice. The navigation unit 34 and the display screen 38 may be implemented by a general terminal such as a smart phone used by the driver of the target vehicle 30.

The traveling control unit 37 controls acceleration, braking, steering, etc., of the target vehicle 30, thereby causing the target vehicle 30 to travel automatically. The traveling control unit 37 controls acceleration and braking, based on the recommended traveling speed. For example, on an acceleration lane at a merging point of a freeway, the traveling control unit 37 performs traveling based on the recommended traveling speed provided from the server 20, and makes a smooth lane change to a cruising lane. However, for safe driving, the traveling control unit 37 automatically controls the traveling speed according to surrounding situations obtained by a radar device, an image sensor, or the like.

5. Processing Flow of Server 20

Hereinafter, processing executed by the server 20 will be described in detail.

Figure 6:
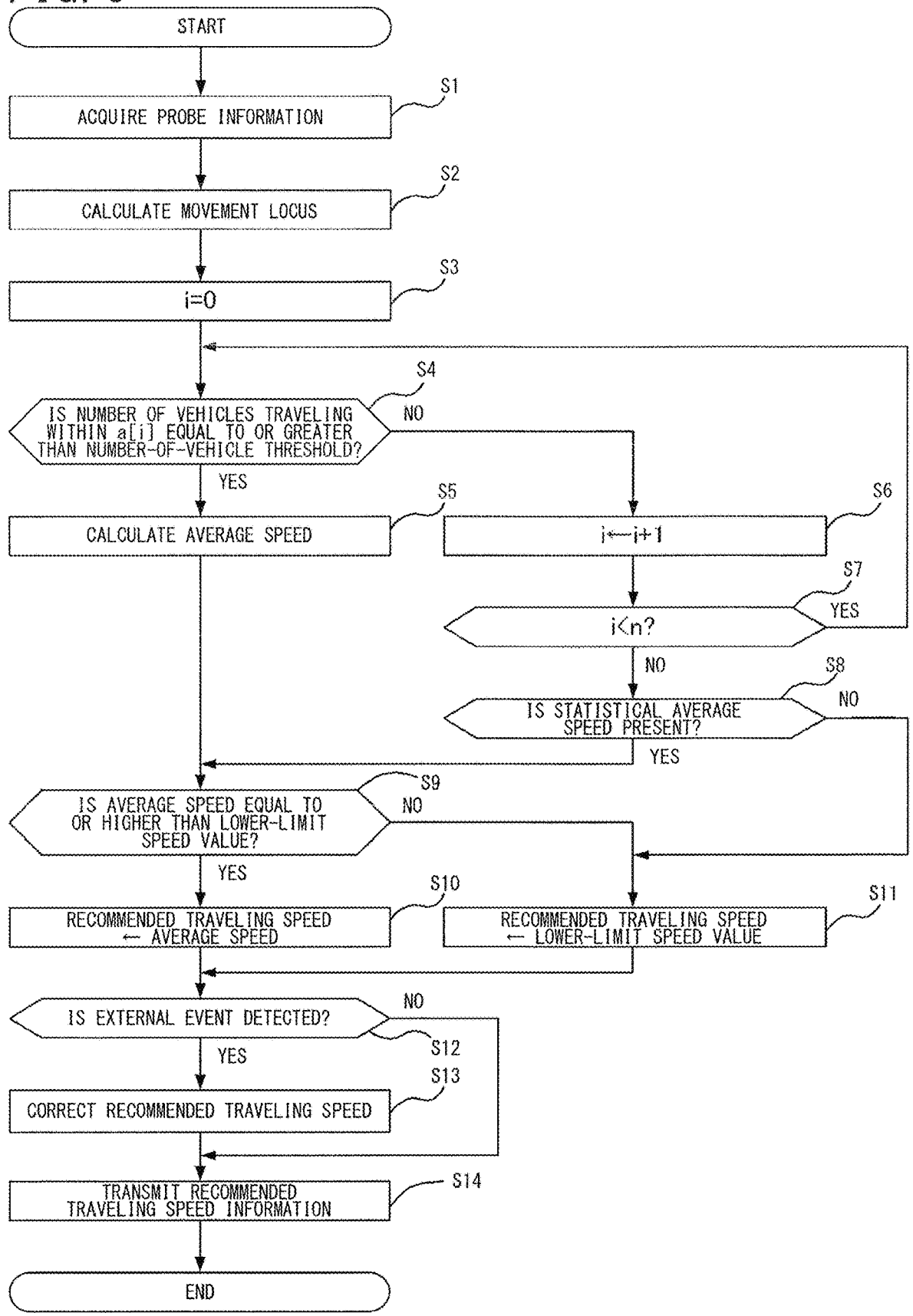
FIG. 6 is a flowchart showing a flow of processing executed by the server.
Figure 7:
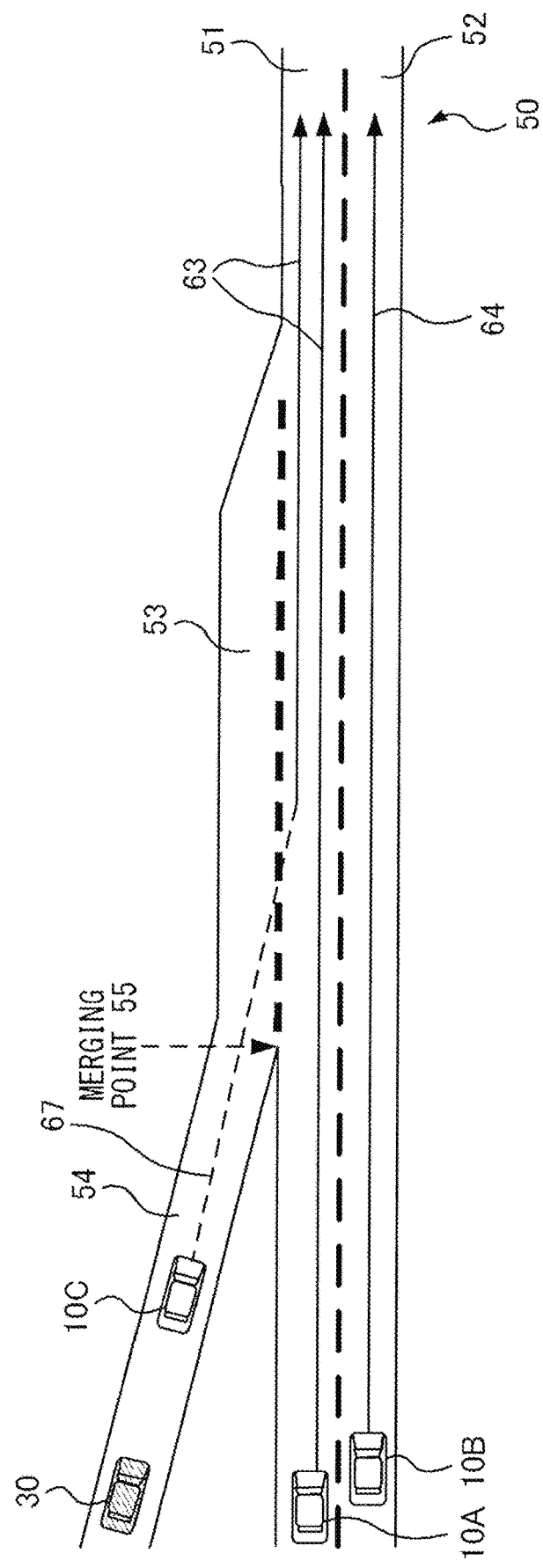
FIG. 7 is a diagram for explaining the processing executed by the server.

FIG. 6 is a flowchart showing a flow of processing executed by the server 20. FIG. 7 is a diagram for explaining the processing executed by the server 20. FIG. 7 shows a freeway 50, and vehicles traveling on the freeway 50 and a lane merging to the freeway 50. The freeway 50 consists of two main lanes, i.e., a cruising lane 51 and a passing lane 52. A ramp 54 and an acceleration lane 53, which connect an entrance of the freeway 50 to the cruising lane 51, are provided as a merging lane for merging to the main lanes. For example, it is assumed that a probe vehicle 10A travels on the cruising lane 51, a probe vehicle 10B travels on the passing lane 52, and a probe vehicle 10C travels on the ramp 54. Further, it is assumed that the target vehicle 30 travels on the ramp 54.

With reference to FIG. 6, the acquisition unit 22 acquires probe information including time information within a predetermined time period (e.g., 15 minutes prior to the present time) from each probe vehicle 10 via the communication I/F unit 21 (S1). The acquisition unit 22 writes the acquired probe information into the locus information accumulation unit 23. The predetermined time period is desirably about 5 to 15 minutes, and at the longest, one hour.

The representative traveling speed calculation unit 26 performs a map matching process on probe information of each probe vehicle 10 to estimate a correct position of the probe vehicle 10 on the road, and calculates a movement locus, of each probe vehicle 10, consisting of a set of pieces of probe information (S2). The representative traveling speed calculation unit 26 writes information of the calculated movement locus into the locus information accumulation unit 23.

The representative traveling speed calculation unit 26 substitutes 0 for a counter i (S3).

Based on the movement locus information of the probe vehicles 10 accumulated in the locus information accumulation unit 23, the representative traveling speed calculation unit 26 determines whether or not probe vehicles 10 not less than a predetermined number-of-vehicle threshold (e.g., 3) have passed through an area around a merging point 55, i.e., a predetermined region including the merging point 55, within a[i] minutes prior to the present time (S4). The present time is, for example, a time at which the process in step S4 is started. It is assumed that an array a is determined to be a=[5, 10, 15, 30], for example. That is, a[0]=5, a[1]=10, a[2]=15, and a[3]=30. It is assumed that the predetermined region including the merging point 55 is, for example, a region on the main lanes within a 1-kilometer radius around the merging point 55.

Upon determining that probe vehicles 10 not less than the number-of-vehicle threshold have passed through the predetermined region including the merging point 55 within a[i] minutes (YES in S4), the representative traveling speed calculation unit 26 calculates an average speed of the probe vehicles 10 having passed through the predetermined region including the merging point 55 within a[i] minutes, based on probe information including positional information within the predetermined region (S5). The speeds of the probe vehicles 10 used for calculation of the average speed are the speeds on the main lanes. For example, as for the probe vehicle 10C shown in FIG. 7, the speed thereof during traveling on a traveling path 67 (shown by a broken line) on the ramp 54 and the acceleration lane 53 is not used, but the speed thereof during traveling on a traveling path 63 (shown by a solid line) on the cruising lane 51 is used. That is, probe information of the probe vehicle 10A and the probe vehicle 10C when traveling on the traveling path 63 on the cruising lane 51, and probe information of the probe vehicle 10B when traveling on the traveling path 64 on the passing lane 52, are used. If the acceleration lane 53 and the cruising lane 51 cannot be discriminated from each other depending on the positional accuracy of the probe information, the speed during traveling on the acceleration lane 53 is also used.

Upon determining that the number of probe vehicles 10 having passed through the predetermined region including the merging point 55 within a[i] minutes is less than the number-of-vehicle threshold (NO in S4), the representative traveling speed calculation unit 26 increments the value of the counter i by 1 (S6).

The representative traveling speed calculation unit 26 determines whether or not the value of the counter i is smaller than the number-of-elements n in the array a (the number-of-elements n is 4 in the aforementioned array a) (S7), and returns to step S4 when the value of the counter i is smaller than the number-of-elements n in the array a (YES in S7).

When the value of the counter i is equal to or larger than the number-of-elements n in the array a (NO in S7), this result shows that probe vehicles 10 less than the number-of-vehicle threshold have passed, and therefore, the representative traveling speed calculation unit 26 determines whether or not there is a statistically obtainable average speed (S8). A statistically obtainable average speed is, for example, an average speed of probe vehicles 10 obtained in the same time zone on the same day of a week in the past. When there is a statistically obtainable average speed, the representative traveling speed calculation unit 26 calculates this speed as an average speed. The statistically obtainable average speed is stored in a storage unit by the representative traveling speed calculation unit 26.

The recommended traveling speed calculation unit 27 determines whether or not the average speed calculated by the representative traveling speed calculation unit 26 is equal to or higher than a predetermined lower limit speed value (S9). The lower limit speed value is, for example, 20 km/h, and may cause a traffic congestion when vehicles travel at speeds lower than the lower limit speed value.

Upon determining that the average speed is equal to or higher than the lower limit speed value (YES in S9), the recommended traveling speed calculation unit 27 calculates the average speed as a recommended traveling speed (S10). On the other hand, upon determining that the average speed is lower than the lower limit speed value (NO in S9), the recommended traveling speed calculation unit 27 calculates the lower limit speed value as a recommended traveling speed (S11). If the representative traveling speed calculation unit 26 could not calculate an average speed (NO in S8), the recommended traveling speed calculation unit 27 calculates the lower limit speed value as a recommended traveling speed (S11).

Based on the current weather information obtained from the weather server by the acquisition unit 22, the recommended traveling speed calculation unit 27 detects whether or not an external event, which is accumulated in the external event accumulation unit 25, is occurring (S12). For example, when the current weather information acquired from the weather server is "precipitation=12 mm/h", this means that the external event "precipitation not less than 10 mm/h" shown in FIG. 4 is occurring.

Upon detecting an external event (YES in S12), the recommended traveling speed calculation unit 27 corrects the recommended traveling speed, based on a correction value for the external event (S13). For example, when the external event "precipitation not less than 10 mm/h" is detected, the recommended traveling speed calculation unit 27 subtracts 10 km/h from the recommended traveling speed calculated in step S10 or S11, and sets the resultant value as a new recommended traveling speed. However, correction of a recommended traveling speed may be performed so that the corrected recommended traveling speed is not lower than the lower limit speed value.

The provision unit 28 transmits information of the recommended traveling speed calculated by the recommended traveling speed calculation unit 27 to the target vehicle 30 via the communication I/F unit 21 (S14). For example, the recommended traveling speed information is transmitted to the target vehicle 30 traveling on the ramp 54.

Upon receiving the recommended traveling speed information, the target vehicle 30 displays the recommended traveling speed information on the display screen 38, and causes the traveling control unit 37 to control acceleration and braking thereof according to the recommended traveling speed.

Thus, the target vehicle 30 can merge into the main lane at a speed similar to the speeds of vehicles traveling on the main lane. Therefore, the target vehicle 30 can smoothly merge into the main lane without hindering traveling of vehicles on the main lane.

The server 20 may execute the processing shown in FIG. 6 at regular intervals or each time when the server 20 has acquired a predetermined number of pieces of probe information.

6. Effect and the Like of First Embodiment

As described above, according to the first embodiment, a representative traveling speed of probe vehicles 10 and a recommended traveling speed are calculated based on probe information acquired from the probe vehicles 10, and the recommended traveling speed is provided to the target vehicle 30. The place where probe information is acquired is not limited to a narrow area such as an area around the merging point 55 or the like, and probe information can be acquired from a probe vehicle 10 traveling on an arbitrary point. In addition, the place where a recommended traveling speed is provided is not limited to a narrow area around the merging point 55 or the like. Therefore, support of speed control can be performed in advance for the target vehicle 30 traveling on a lane, in particular, the target vehicle 30 merging to the merging point 55.

When probe information could not be acquired within the predetermined time period, a recommended traveling speed is calculated based on an average speed calculated based on probe information acquired in the past. Therefore, even when probe information could not be acquired, the target vehicle 30 can perform speed control according to an appropriate recommended traveling speed. For example, by using a recommended traveling speed based on probe information acquired in the same time zone on the same day of a week in the past, the target vehicle 30 can perform speed control in a traffic condition similar to the current traffic condition, thereby supporting safe driving.

When the average speed of probe vehicles 10 becomes lower than the lower limit speed value due to traffic congestion or the like, the target vehicle can be prevented from being provided with a recommended traveling speed lower than the lower limit speed value. Thus, more traffic congestion is prevented from occurring. For example, when the average speed of probe vehicles 10 is lower than the lower limit speed value because of traffic congestion on the main lane but the merging lane is not congested, the target vehicle traveling on the merging lane is prevented from receiving an excessively low recommended traveling speed. Thus, traffic congestion on the merging lane can be avoided.

The target vehicle 30 can control the traveling speed thereof, based on a recommended traveling speed calculated based on the average speed based on probe information of probe vehicles 10. The space where a recommended traveling speed is provided is not limited to a narrow area around the merging point or the like. Therefore, the target vehicle 30 can receive support of speed control at an arbitrary point.

Second Embodiment

In the first embodiment, a recommended traveling speed is calculated without discriminating the courses of probe vehicles 10 from each other. In this second embodiment, a recommended traveling speed is calculated for each of the courses of probe vehicles 10. It is assumed that probe information provided by each probe vehicle 10 includes information of a lane, or has positional information that is so accurate that a lane can be identified. For example, it is assumed that each probe vehicle 10 is an automatic traveling vehicle performing traveling control based on highly-accurate map information.

The traveling support system according to the second embodiment has the same configuration as the traveling support system 1 according to the first embodiment shown in FIG. 1.

The probe vehicle 10, the server 20, and the target vehicle 30 according to the second embodiment have the same configurations as the probe vehicle 10, the server 20, and the target vehicle 30 according to the first embodiment shown in FIG. 2, FIG. 3, and FIG. 5, respectively.

Figure 8:
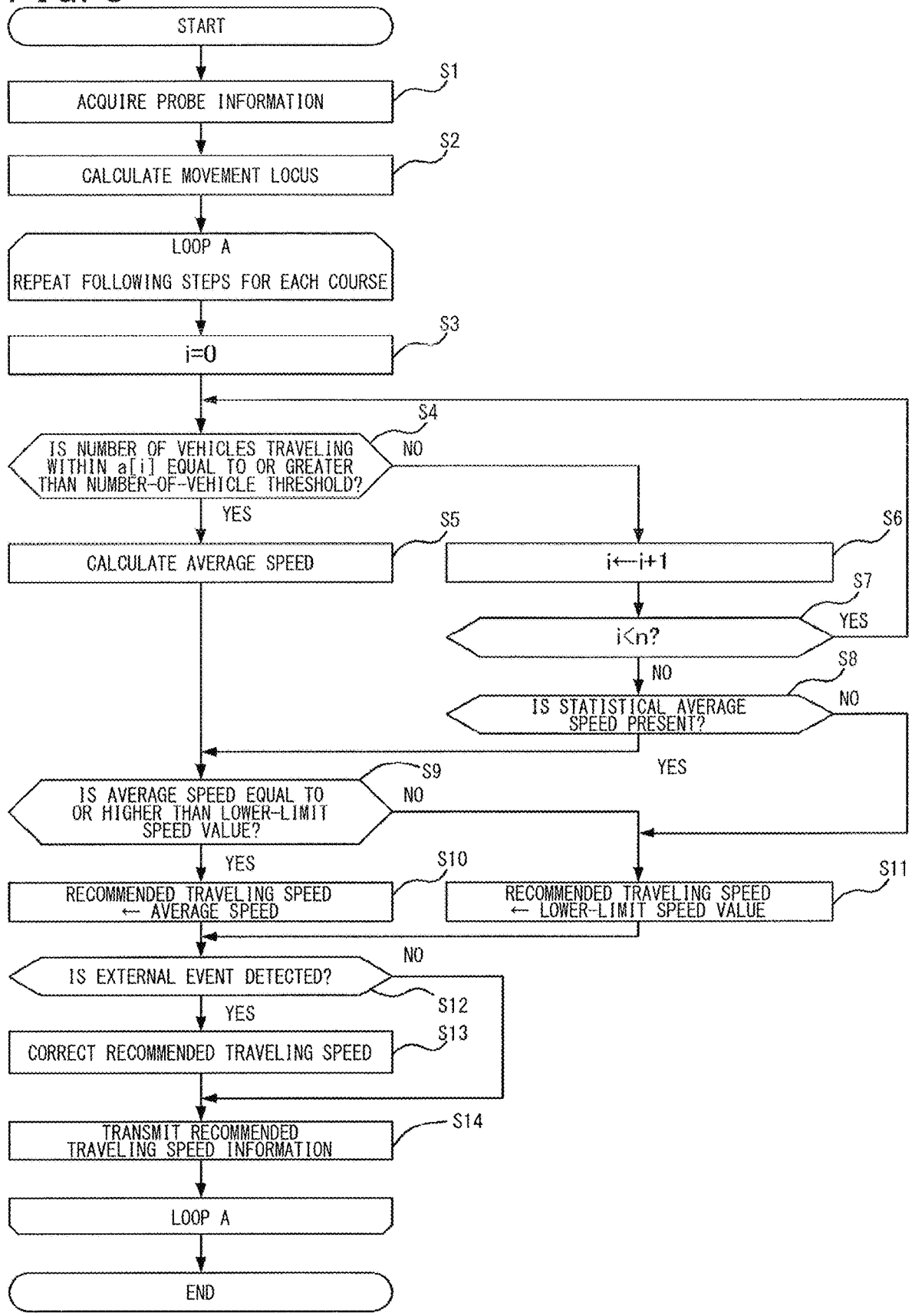
FIG. 8 is a flowchart showing a flow of processing executed by the server.

FIG. 8 is a flowchart showing a flow of processing executed by the server 20.

With reference to FIG. 8, the processes in steps S1 to S14 are the same as those shown in FIG. 6. However, the average speed calculating process, the recommended traveling speed calculating process, and the recommended traveling speed transmitting process (S3 to S14) are repeatedly executed for each of the courses of probe vehicles 10 (loop A). For example, in FIG. 7, the traveling path 67 (shown by a broken line) on the ramp 54 and the acceleration lane 53, the traveling path 63 on the cruising lane 51, and the traveling path 64 on the passing lane 52 are regarded as different courses. The representative traveling speed calculation unit 26 and the recommended traveling speed calculation unit 27 calculate, for each course, an average speed and a recommended traveling speed, respectively, and the provision unit 28 provides the recommended traveling speed for each course.

Thus, the target vehicle 30 can acquire a recommended traveling speed for each course. Therefore, the target vehicle 30 can travel at a most appropriate recommended traveling speed for each course. For example, the target vehicle 30, while traveling on the ramp 54, controls the speed thereof so as to travel at a recommended traveling speed based on the probe information of the probe vehicle 10C traveling on the traveling path 67. Meanwhile, the target vehicle 30, when making a lane change from the acceleration lane 53 to the cruising lane 51, controls the speed thereof so as to travel at a recommended traveling speed based on the probe information of the probe vehicle 10A traveling on the traveling path 63. Thus, the target vehicle 30 can make a lane change to the main lane without causing reduction in speed of vehicles traveling on the main lane.

The provision unit 28 may provide, to the target vehicle 30, only a recommended traveling speed required for a lane change from the merging lane to the main lane. That is, the provision unit 28 may provide only a recommended traveling speed based on the probe information of the probe vehicle 10A traveling on the traveling path 63.

The server 20 may execute the processing shown in FIG. 8 at regular intervals or each time when the server 20 has acquired a predetermined number of pieces of probe information.

As described above, since an automatic traveling vehicle travels based on map information having highly-accurate positional information, lane information can be included in probe information acquired from the automatic traveling vehicle. According to the second embodiment, a recommended traveling speed for each course can be calculated and provided to the target vehicle 30. Therefore, the target vehicle 30 can perform speed control according to the recommended traveling speed for each course. For example, when the target vehicle 30 merges from the acceleration lane 53 into the cruising lane 51, the target vehicle 30 performs speed control according to a recommended traveling speed for the cruising lane 51, thereby achieving the speed control without being affected by the traveling speeds of vehicles traveling on the passing lane 52.

Third Embodiment

While a recommended traveling speed for each course is calculated in the second embodiment, a recommended traveling speed for each zone is calculated in this third embodiment.

A traveling support system according to the third embodiment has the same configuration as the traveling support system 1 according to the first embodiment shown in FIG. 1.

The probe vehicle 10, the server 20, and the target vehicle 30 according to the third embodiment have the same configurations as the probe vehicle 10, the server 20, and the target vehicle 30 according to the first embodiment shown in FIG. 2, FIG. 3, and FIG. 5, respectively.

The flow of processing executed by the server 20 according to the third embodiment is identical to that of the second embodiment shown in FIG. 8 except that the repetitive processes (loop A) are performed not for each course but for each zone.

Figure 9:
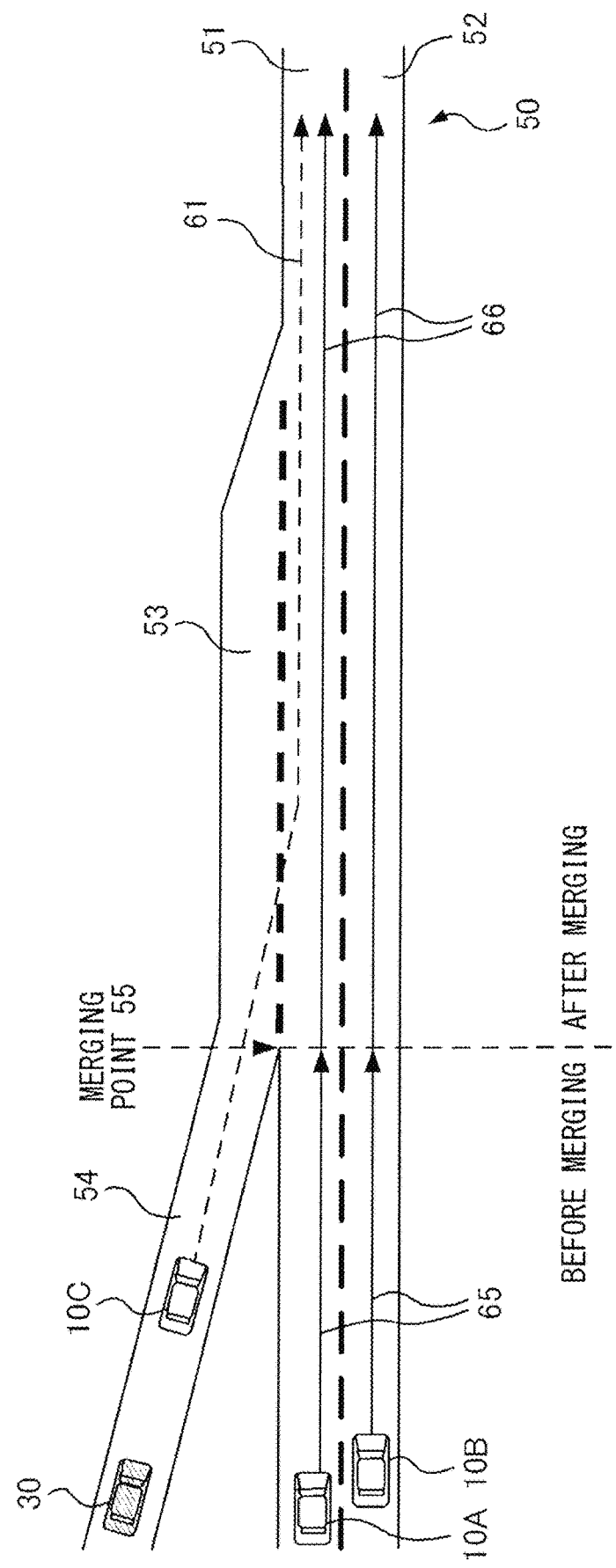
FIG. 9 is a diagram for explaining the processing executed by the server.

FIG. 9 is a diagram for explaining the processing executed by the server 20. Zones in which the processing is performed include: a zone on a main lane and upstream of the merging point 55 (hereinafter, this zone is referred to as "pre-merging zone"); and a zone on the main lane and downstream of the merging point 55 (hereinafter, this zone is referred to as "post-merging section"). That is, the server 20 calculates a recommended traveling speed for each of the zones. In calculating a recommended traveling speed, probe information of the probe vehicle 10C that seems to merge from the merging lane into the main lane is not used. Merging from the merging lane into the main lane is determined based on a movement locus.

According to the third embodiment, a recommended traveling speed can be calculated for each of the zones on the road, and provided to the target vehicle 30. Therefore, the target vehicle 30 can perform speed control according to the recommended traveling speed for each zone. For example, when speed control for the target vehicle 30 is performed by using a recommended traveling speed for the pre-merging zone, the target vehicle 30 can merge into the main lane without causing reduction in traveling speed of vehicles traveling on the main lane. On the other hand, when speed control for the target vehicle 30 is performed by using a recommended traveling speed for the post-merging zone, the states of vehicles after merging can be reflected in the speed control. Thus, the target vehicle 30 can perform speed control such as deceleration in advance, in case that the lane into which the target vehicle 30 merges is congested with vehicles.

A recommended traveling speed is calculated based on probe information acquired from probe vehicles 10 advancing on the main lane, without using probe information of probe vehicles 10 traveling on the merging lane. Therefore, when the target vehicle 30 merges from the merging lane into the main lane, the target vehicle 30 can travel on the merging lane at a speed conforming to the traveling speeds of vehicles already traveling on the main lane. Therefore, the target vehicle 30 can smoothly merge from the merging lane into the main lane.

Fourth Embodiment

In the second embodiment, a recommended traveling speed is calculated while discriminating the courses of probe vehicles 10 from each other, based on probe information acquired from probe vehicles 10 that are automatic traveling vehicles. However, probe information to be used for calculation of a recommended traveling speed for each course is not limited to probe information acquired from automatic traveling vehicles. That is, any probe information can be used for calculation of a recommended traveling speed for each course, as long as the probe information is acquired from a probe vehicle 10 whose traveling lane can be identified. Hereinafter, a vehicle whose traveling lane can be identified is referred to as a lane identifiable vehicle. An automatic traveling vehicle is a type of lane identifiable vehicle.

In this fourth embodiment, the lane identifiable vehicle will be described in detail.

[Configuration of Probe Vehicle 10 as Lane Identifiable Vehicle]

Figure 10:
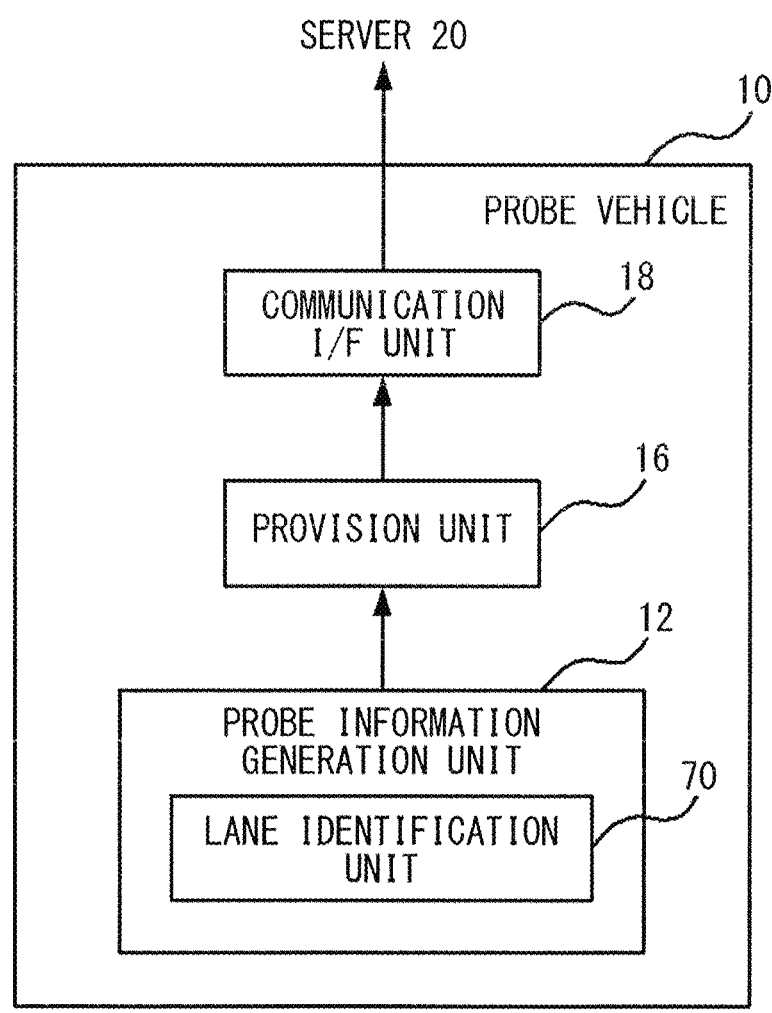
FIG. 10 is a block diagram showing a functional configuration of a probe vehicle that is a lane identifiable vehicle.

FIG. 10 is a block diagram showing a functional configuration of a probe vehicle 10 that is a lane identifiable vehicle. With reference to FIG. 10, the probe vehicle 10 includes a lane identification unit 70 instead of the GPS device 14 in the configuration of the probe vehicle 10 shown in FIG. 2.

Figure 11:
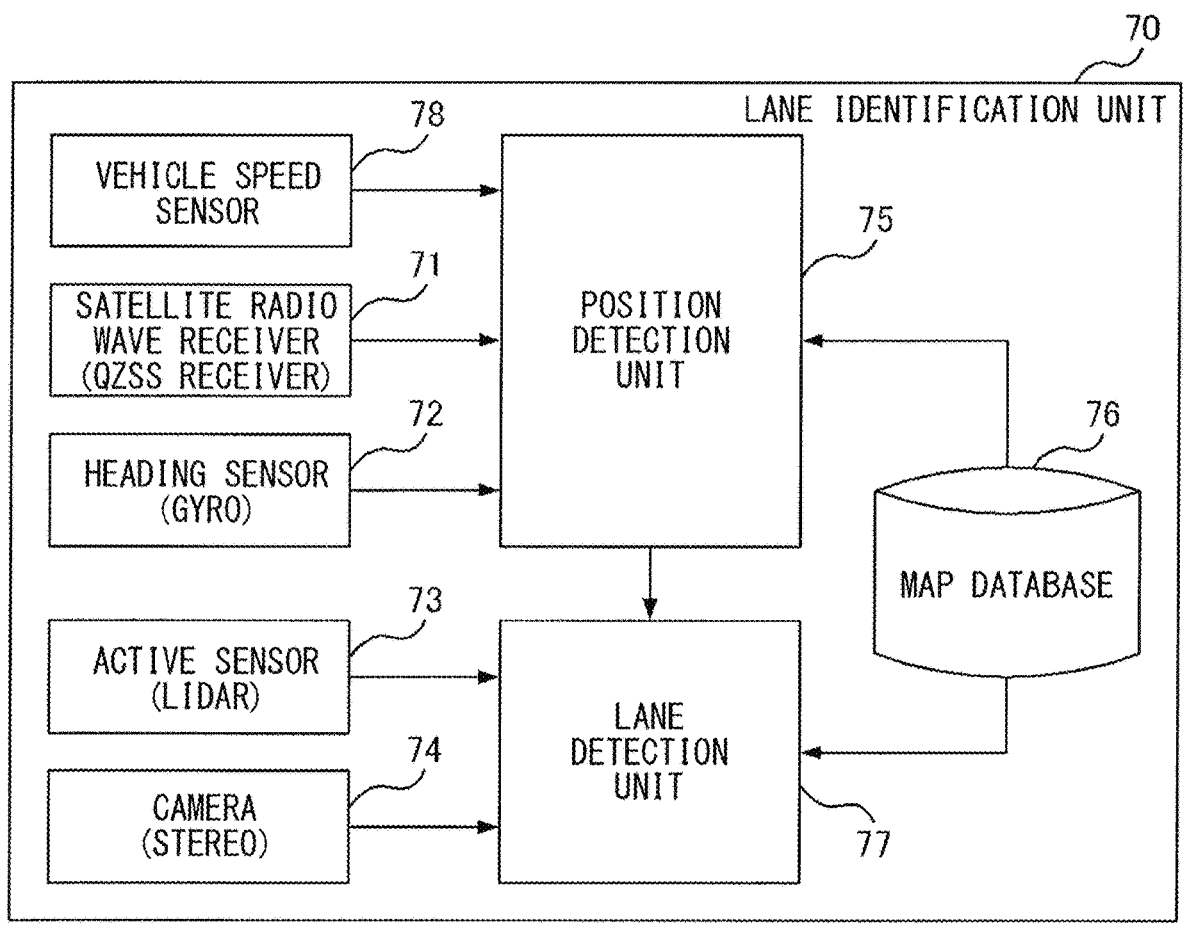
FIG. 11 is a block diagram showing a functional configuration of a lane identification unit.

FIG. 11 is a block diagram showing a configuration of the lane identification unit 70. With reference to FIG. 11, the lane identification unit 70 is a processing unit for identifying a road link and a lane on which the probe vehicle 10 travels. The lane identification unit 70 includes a vehicle speed sensor 78, a satellite radio wave receiver 71, a heading sensor 72, an active sensor 73, a camera 74, a position detection unit 75, a map database 76, and a lane detection unit 77. The position detection unit 75 and the lane detection unit 77 are implemented by, for example, a processor such as a CPU or an MPU that performs digital signal processing. These units 75 and 77 may be implemented by a single processor, or may be implemented by separate processors.

The vehicle speed sensor 78 obtains speed information by measuring the number of rotations of the wheels of the probe vehicle 10. The traveling speed information of the probe vehicle 10 detected by the vehicle speed sensor 78 may be included in the probe information.

The satellite radio wave receiver 71 receives radio waves from a satellite, and measures the latitude, longitude, and altitude of the position where the probe vehicle 10 is located. Although a GPS receiver is commonly used as the satellite radio wave receiver 71, it is desirable to use a QZSS (Quasi-Zenith Satellite System) receiver having higher accuracy than the GPS receiver. By using the QZSS receiver, a positioning signal received by a GPS receiver is complemented and reinforced to improve positioning accuracy.

The heading sensor 72 is a sensor for measuring heading of the probe vehicle 10, and is implemented by an oscillating-type gyroscope or an optical gyroscope. It is desirable to use, as the heading sensor 72, an optical gyroscope having higher accuracy than the oscillating-type gyroscope.

The active sensor 73 is a sensor for detecting white lines and structures. A sensor using a millimeter wave radar or the like is known as the active sensor 73. However, it is desirable to use LIDAR (Light Detection and Ranging, Laser Imaging Detection and Ranging) which is able to include a difference in reflectivity between a white line and a road surface, in data showing a three-dimensional space structure. According to LIDAR, the distance to a target and the characteristics of the target can be analyzed by measuring scattering light from the target caused by irradiation with laser light emitted in a pulse shape.

The camera 74 detects a white line and a structure from a captured image. The camera 74 may be either a monocular camera or a stereo camera, but it is desirable to use the stereo camera which is able to three-dimensionally determine whether or not a white line is present on the road surface.

The map database 76 is implemented by an HDD or the like in which highly-accurate road map data is stored. The road map data includes information such as road edge (division) lines, road (lane) center lines, road widths, vertical and cross slopes, traffic signal/sign points, stop lines, etc., and has a read-ahead network structure.

The position detection unit 75 collates the positional information of the probe vehicle 10 measured by the satellite radio wave receiver 71 with the road map data stored in the map database 76, thereby detecting the position, on the road link, where the probe vehicle 10 is traveling. For example, the position detection unit 75 obtains a traveling locus of the probe vehicle 10 from the positional information of the probe vehicle 10 sequentially outputted from the satellite radio wave receiver 71. The position detection unit 75 compares the obtained traveling locus with the road map data stored in the map database 76, and performs a map matching process of correcting the present position of the probe vehicle 10 on the road, focusing on feature parts on the traveling locus, such as intersections and inflection points, thereby detecting the position of the probe vehicle 10 (refer to Patent Literature 4, for example). If the satellite radio wave receiver 71 cannot measure the positional information of the probe vehicle 10 due to the radio wave status or the like, the position detection unit 75 may calculate the traveling distance of the probe vehicle 10 from the speed of the probe vehicle 10 obtained from the vehicle speed sensor 78, and may sequentially calculate the position of the probe vehicle 10, based on the calculated traveling distance and heading information of the probe vehicle 10 measured by the heading sensor 72.

The lane detection unit 77 collates the white line and the structure detected by the active sensor 73 and the white line and the structure detected by the camera 74 with the road map data stored in the map database 76, thereby identifying the positions of the white line and the structure on the map. The lane detection unit 77 collates the position on the road link where the probe vehicle 10 is traveling, which has been detected by the position detection unit 75, with the positions of the white line and the structure on the map, thereby detecting a lane, on the road link, where the probe vehicle 10 is traveling. The lane detection unit 77 may selectively use the detection result of the active sensor 73 and the detection result of the camera 74 according to the situation. For example, the lane detection unit 77 may use, in a normal situation, the detection result of the camera 74 to identify the positions of the white line and the structure, whereas the lane detection unit 77 may use, in a situation such as nighttime or bad weather where the driver's visibility around the vehicle is degraded, the detection result of the active sensor 73 which is less affected by the degraded visibility, to identify the positions of the white line and the structure (refer to Patent Literatures 5 and 6, for example).

The lane detection unit 77 may collate positional information of fixed objects (e.g., an illuminating lamp installed at the road shoulder, a cat's eye on the road surface, etc.) detected by the probe vehicle 10 with positional information of fixed objects indicated by the road map data, thereby correcting the position of the probe vehicle 10 (refer to Patent Literature 4, for example).

The information of the position on the road link and the line where the probe vehicle 10 is traveling, which are detected by the position detection unit 75 and the lane detection unit 77, respectively, are included in the probe information generated by the probe information generation unit 12 and transmitted to the server 20.

[Configuration of Target Vehicle 30 as Lane Identifiable Vehicle]

Figure 12:
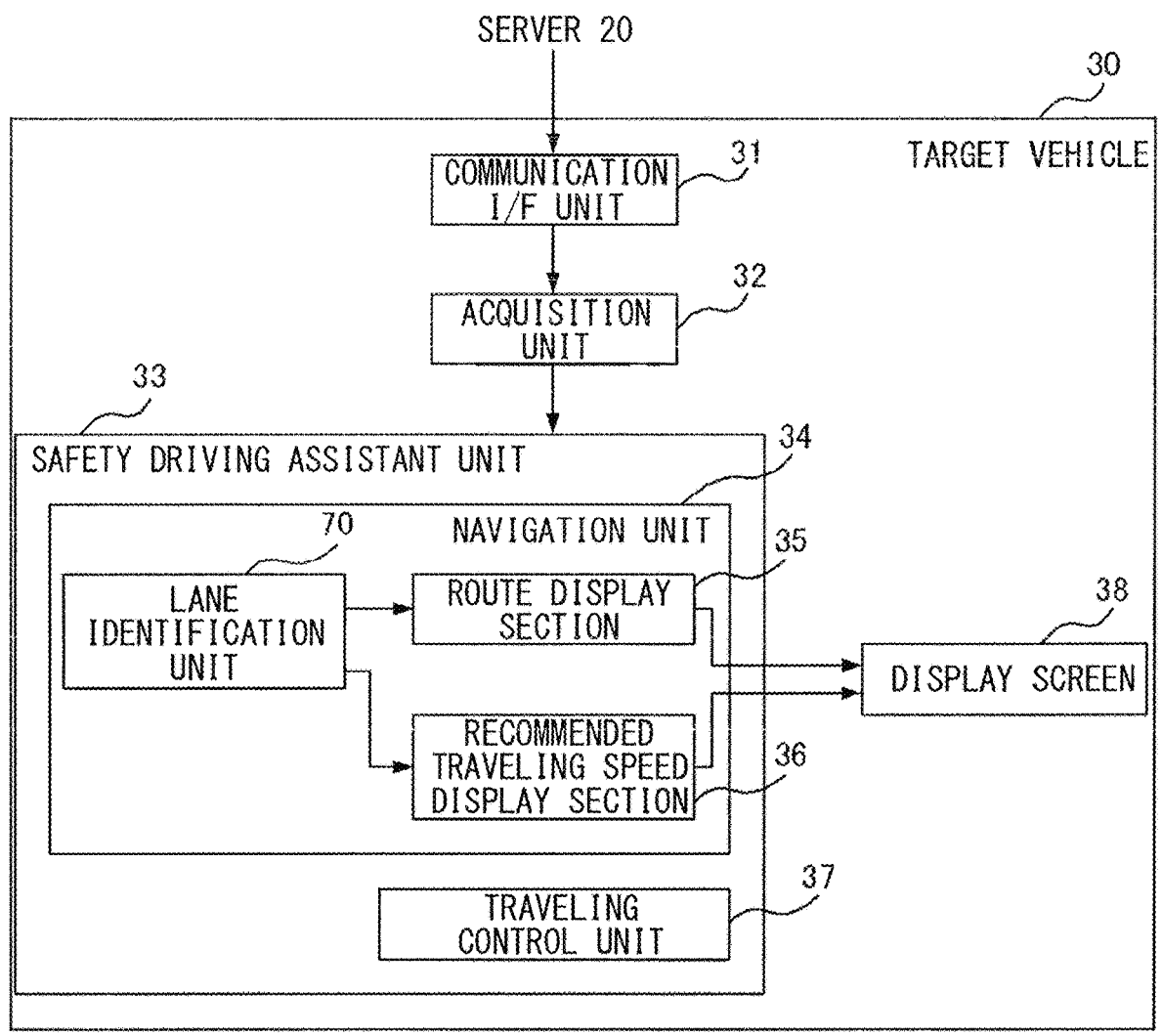
FIG. 12 is a diagram showing a functional configuration of a target vehicle including a lane identification unit.

The configuration of the lane identification unit 70 described above may be included in the target vehicle 30. FIG. 12 is a diagram showing a functional configuration of the target vehicle 30 including the lane identification unit 70. In the target vehicle 30 shown in FIG. 12, the navigation unit 34 further includes the lane identification unit 70 in addition to the components of the target vehicle 30 shown in FIG. 4.

The route display section 35 calculates a route to a destination while discriminating the lanes from each other, based on the traveling position and the traveling lane of the target vehicle 30 which are identified by the lane identification unit 70, and performs control to display the calculated route on the display screen 38. For example, in order to cause the target vehicle 30, which is traveling on a passing lane of a freeway and plans to exit from the freeway via a left exit, to safely exit from the freeway via the left exit, the route display section 35 calculates a route in which the target vehicle 30 makes a lane change to the leftmost cruising lane in advance. Then, the route display section 35 displays information of the calculated route on the display screen 38.

The recommended traveling speed display section 36 performs control to display, on the display screen 38, a recommended traveling speed for each lane identified by the lane identification unit 70. For example, in the second embodiment, a recommended traveling speed is calculated for each of the traveling path 67, the traveling path 63, and the traveling path 64 shown in FIG. 7. Therefore, the recommended traveling speed display section 36 may perform control to display, on the display screen 38, a recommended traveling speed for each lane, i.e., for each traveling path, on which the target vehicle 30 travels. For example, when the target vehicle 30 travels on the traveling path 67, the recommended traveling speed display section 36 performs control to display, on the display screen 38, a recommended traveling speed of vehicles traveling on the traveling path 67. Thus, the driver can drive safely in accordance with the recommended traveling speed that varies from lane to lane.

[Additional Notes]

While the traveling support systems 1 according to the embodiments of the present disclosure have been described above, the present disclosure is not limited to the embodiments.

MODIFICATIONS

In the first embodiment, probe information acquired from automatic traveling vehicles and probe information acquired from ordinary vehicles driven by drivers are used without discriminating them from each other. However, a representative traveling speed may be calculated by preferentially using the probe information acquired from the automatic traveling vehicles. For example, the speeds based on the probe information acquired from the automatic traveling vehicles may be weighted twice as compared to the speeds based on the probe information acquired from the ordinary vehicles, and a weighted average of the speeds may be calculated to be used as a representative traveling speed.

When it is determined in step S4 in FIG. 5 that automatic traveling vehicles not less than the number-of-vehicle threshold have passed, a representative traveling speed may be calculated by using only probe information acquired from the automatic traveling vehicles.

An automatic traveling vehicle travels based on map information having highly-accurate positional information. In addition, the automatic traveling vehicle is provided with various sensors such as a camera and a radar device for observing the surrounding situations, and is designed to perform safe driving at all times. Therefore, as in the modification, when calculation of a representative traveling speed is performed by preferentially using probe information acquired from automatic traveling vehicles, a recommended traveling speed suitable for safe traveling can be calculated and provided to the target vehicle. Therefore, the target vehicle can perform speed control according to the safe recommended traveling speed.

As for probe information acquired from lane identifiable vehicles described in the fourth embodiment, this probe information may be weighted more than probe information acquired from ordinary vehicles, and a weighted average of speeds may be calculated to be used as a representative traveling speed, as in the case of probe information acquired from automatic traveling vehicles.

In the first to third embodiments, a recommended traveling speed is determined so as not to be lower than the lower limit speed value. In addition to this, a recommended traveling speed may be determined so as not to be higher than a predetermined upper-limit speed value. For example, a regulation speed of a cruising lane may be set as an upper-limit speed value. Thus, the target vehicle 30 can make a lane change to the main lane at a safe speed. However, if traveling at the regulation speed may cause a dangerous situation such as collision with a trailing vehicle, the target vehicle 30 appropriately controls the traveling speed.

Although the target vehicle 30 shown in FIG. 5 is assumed to be an automatic traveling vehicle, the target vehicle 30 may not include the traveling control unit 37 when it is an ordinary vehicle driven by a driver.

The target vehicle 30 may further include the configuration of the probe vehicle 10 shown in FIG. 2. Thus, the target vehicle 30 can transmit probe information.

Each of the aforementioned apparatuses may be specifically configured as a computer system including a microprocessor, an ROM, an RAM, a hard disk drive, a display unit, a keyboard, a mouse, etc. A computer program is stored in the RAM or the hard disk drive. Each apparatus achieves its function through the microprocessor being operated according to the computer program. The computer program is configured by combining a plurality of command codes indicating commands to the computer, in order to achieve predetermined functions.

A part or all of the components of the respective apparatuses may be configured as a single system LSI. The system LSI is a super-multi-function LSI manufactured such that a plurality of components are integrated on a single chip. Specifically, the system LSI is a computer system configured to include a microprocessor, an ROM, an RAM, etc. A computer program is stored in the RAM. The system LSI achieves its function through the microprocessor being operated according to the computer program.

The present disclosure may be the method described above. Further, the present disclosure may be a computer program that causes a computer to execute the method, or may also be a digital signal including the computer program.

The present disclosure may also be realized by storing the computer program or the digital signal in a computer-readable non-transitory recording medium such as a hard disk drive, a CD-ROM, or a semiconductor memory. Alternatively, the present disclosure may also be the digital signal recorded in the non-transitory recording medium.

The present disclosure may also be realized by transmission of the aforementioned computer program or digital signal via a telecommunication line, a wireless or wired communication line, a network represented by the Internet, a data broadcast, etc.

The respective steps included in the program may be executed by a plurality of computers. For example, the representative traveling speed calculation unit 26 and the recommended traveling speed calculation unit 27 included in the server 20 may be implemented by executing programs distributed to a plurality of computers.

The aforementioned embodiments and modifications may be respectively combined.

It is noted that the embodiments disclosed herein are merely illustrative in all aspects and should not be recognized as being restrictive. The scope of the present disclosure is defined by the scope of the claims rather than the meaning described above, and is intended to include meaning equivalent to the scope of the claims and all modifications within the scope.

REFERENCE SIGNS LIST 1 traveling support system
10, 10A, 10B, 10C probe vehicle
12 probe information generation unit
14 GPS device
16 provision unit
18 communication I/F unit
20 server
21 communication I/F unit
22 acquisition unit
23 locus information accumulation unit
24 map information accumulation unit
25 external event accumulation unit
26 representative traveling speed calculation unit
27 recommended traveling speed calculation unit
28 provision unit
30 target vehicle
31 communication I/F unit
32 acquisition unit
33 safety driving assistant unit
34 navigation unit
35 route display section
36 recommended traveling speed display section
37 traveling control unit
38 display screen
40 network
42 wireless base station
50 freeway
51 cruising lane
52 passing lane
53 acceleration lane
54 ramp
55 merging point
61, 63, 64, 65, 66, 67 traveling path
70 lane identification unit
71 satellite radio wave receiver
72 heading sensor
73 active sensor
74 camera
75 position detection unit
76 map database
77 lane detection unit
78 vehicle speed sensor

The invention claimed is:

1. A tangible, non-transitory computer readable storage medium storing a computer program for providing a recommended traveling speed to a target vehicle, the computer program, when executed by one or more processors, cause the one or more processors to perform operations comprising:

acquiring, via a communication network, pieces of probe information from probe vehicles traveling on a road, each piece of probe information including information of a time within a predetermined time period and a position of the corresponding probe vehicle at the time;

executing a first calculation process to calculate a representative traveling speed that is a representative value of traveling speeds of the probe vehicles, based on the acquired pieces of probe information;

executing a second calculation process to calculate a recommended traveling speed, based on the calculated representative traveling speed; and providing, via the communication network, the calculated recommended traveling speed to the target vehicle.

2. The tangible, non-transitory computer readable storage medium according to claim 1, wherein the first calculation process includes calculating the representative traveling speed, based on the probe information including information of positions within an area around a merging point at which a plurality of lanes merge, among the acquired pieces of probe information.

3. The tangible, non-transitory computer readable storage medium according to claim 1, wherein the first calculation process includes calculating the representative traveling speed, for each of zones of a road on which the probe vehicles travel, based on the probe information including information of positions included in the zone; and the second calculation process includes calculating the recommended traveling speed for each zone, based on the representative traveling speed calculated for each zone in the first calculation process.

4. The tangible, non-transitory computer readable storage medium according to claim 3, wherein the first calculation process includes calculating the representative traveling speed for each of the zones, based on the acquired pieces of probe information, excluding pieces of probe information of the probe vehicles traveling on a merging lane that merges with a main lane.

5. The tangible, non-transitory computer readable storage medium according to claim 1, wherein the first calculation process includes calculating the representative traveling speed for each of courses on which the probe vehicles travel, based on the probe information including information of positions included in the course, and the second calculation process includes calculating the recommended traveling speed for each course, based on the representative traveling speed calculated for each course in the first calculation process.

6. The tangible, non-transitory computer readable storage medium according to claim 1, wherein the first calculation process includes calculating the representative traveling speed by preferentially using the probe information acquired from a vehicle whose traveling lane can be identified, among the acquired pieces of probe information.

7. The tangible, non-transitory computer readable storage medium according to claim 1, wherein the first calculation process includes, in a case where the pieces of probe information are not acquired from the probe vehicles not less than a predetermined number-of-vehicle threshold within the predetermined time interval, outputting, as a calculation result, a representative traveling speed that has been calculated based on probe information acquired before the predetermined time period.

8. The tangible, non-transitory computer readable storage medium according to claim 1, wherein
the second calculation process includes, in a case where the representative traveling speed calculated in the first calculation process is lower than a predetermined lower limit speed value, calculating the lower limit speed value as the recommended traveling speed.

9. A traveling support system for supporting traveling of a target vehicle, comprising:
a non-transitory computer readable memory storing a computer program; and
a hardware processor coupled to the non-transitory computer readable memory and configured to perform, in accordance with the computer program, operations comprising:
acquiring, via a communication network, pieces of probe information from probe vehicles traveling on a road, each piece of probe information including information of a time within a predetermined time period and a position of the corresponding probe vehicle at the time;
calculating a representative traveling speed that is a representative value of traveling speeds of the probe vehicles, based on the acquired pieces of probe information;
calculating a recommended traveling speed, based on the calculated representative traveling speed; and
providing, via the communication network, the calculated recommended traveling speed to the target vehicle.

10. The traveling support system according to claim 9, further comprising a target vehicle configured to acquire the recommended traveling speed provided from the hardware processor, and to control a traveling speed thereof in accordance with the recommended traveling speed.

11. A vehicle control device for controlling traveling of an automatic traveling vehicle, comprising:
a non-transitory computer readable memory storing a computer program; and
a hardware processor coupled to the non-transitory computer readable memory and configured to perform, in accordance with the computer program, operations comprising:
acquiring, from a server in communication with the processor via a communication network, a recommended traveling speed calculated based on a representative traveling speed that is a representative value of traveling speeds of probe vehicles traveling on a road, the representative traveling speed being based on pieces of probe information generated by the probe vehicles, each piece of probe information including information of a time within a predetermined time period and a position of the corresponding probe vehicle at the time; and
automatically controlling a traveling speed of the automatic traveling vehicle, based on the acquired recommended traveling speed.

12. An automatic traveling vehicle including the vehicle control device according to claim 11.

* * * * *